US011831562B2

(12) United States Patent
Parker et al.

(10) Patent No.: US 11,831,562 B2
(45) Date of Patent: Nov. 28, 2023

(54) DISTRIBUTED DATABASE-DRIVEN RESOURCE MANAGEMENT AND LOCKING IN A CLOUD NATIVE MOBILE CORE NETWORK NODE ARCHITECTURE

(71) Applicant: Microsoft Technology Licensing, LLC, Redmond, WA (US)

(72) Inventors: Ronald M. Parker, Boxborough, MA (US); Jeremy Brown, Richardson, TX (US); Haibo Qian, Frisco, TX (US)

(73) Assignee: Microsoft Technology Licensing, LLC

( * ) Notice: Subject to any disclaimer, the term of this patent is extended or adjusted under 35 U.S.C. 154(b) by 56 days.

(21) Appl. No.: 17/492,889

(22) Filed: Oct. 4, 2021

(65) Prior Publication Data

US 2022/0150181 A1 May 12, 2022

Related U.S. Application Data

(63) Continuation of application No. 16/660,538, filed on Oct. 22, 2019, now Pat. No. 11,140,093.

(Continued)

(51) Int. Cl.
*G06F 15/16* (2006.01)
*H04L 47/783* (2022.01)
(Continued)

(52) U.S. Cl.
CPC .......... *H04L 47/783* (2013.01); *G06F 9/5016* (2013.01); *H04L 47/821* (2013.01); *H04L 47/828* (2013.01)

(58) Field of Classification Search
CPC ... H04L 47/783; H04L 47/821; H04L 47/828; H04L 67/1023; H04L 67/1014
See application file for complete search history.

(56) References Cited

U.S. PATENT DOCUMENTS 9,204,180 B2 * 12/2015 Zhang .................. H04L 65/612
9,922,075 B2 * 3/2018 Fowler .................... G06F 9/466
(Continued)

OTHER PUBLICATIONS

"Notice of Allowance Issued in European Patent Application No. 19804911.6", dated Apr. 19, 2023, 8 Pages.
(Continued)

*Primary Examiner* — Hieu T Hoang
(74) *Attorney, Agent, or Firm* — RAY QUINNEY & NEBEKER P.C; James Bullough (57) ABSTRACT

Systems and methods for efficient database management of non-transitory readable media, including a memory configured to store information associated with service instance requests across a plurality of distributed network resources and a processor configured to receive a service instance request, determine the first native domain object associated with the service instance request, allocate the plurality of network resources to a plurality of distributed worker instances dependent upon a first native domain object, assign the first service instance request to a first worker instance that includes a microservice instance that define service instance blocks to execute the request, and a service instance block manager configured to manage the first service instance request in conjunction with subsequent service instance requests associated with the plurality of worker instances, track running and completed requests, and allocate resources for similar requests across the distributed network nodes.

20 Claims, 5 Drawing Sheets

Related U.S. Application Data (60) Provisional application No. 62/748,688, filed on Oct. 22, 2018.

(51) Int. Cl.
    *G06F 9/50*     (2006.01)
    *H04L 47/70*     (2022.01)

(56) References Cited

U.S. PATENT DOCUMENTS

| | | | | |
|---|---|---|---|---|
| 9,977,807 | B1* | 5/2018 | Bowman | G06F 16/381 |
| 10,339,131 | B1* | 7/2019 | Dolas | G06F 16/182 |
| 10,397,185 | B1* | 8/2019 | Sandholm | H04L 63/102 |
| 10,496,306 | B1* | 12/2019 | Srivastava | G06F 3/0631 |
| 10,521,875 | B2* | 12/2019 | Koker | G06F 9/4893 |
| 10,534,674 | B1* | 1/2020 | Karmarkar | G06F 11/1471 |
| 10,684,801 | B1* | 6/2020 | Bhangria | G06F 3/0637 |
| 2003/0105798 | A1* | 6/2003 | Kim | G06F 9/4812 718/105 |
| 2003/0126200 | A1* | 7/2003 | Wolff | G06F 9/52 709/218 |
| 2004/0205638 | A1* | 10/2004 | Thomas | G06F 16/954 715/255 |
| 2008/0082647 | A1* | 4/2008 | Baker | G06F 9/505 709/223 |
| 2009/0006593 | A1* | 1/2009 | Cortes | H04L 12/66 709/223 |
| 2010/0094921 | A1* | 4/2010 | Roy | G06F 15/16 709/201 |
| 2010/0106855 | A1* | 4/2010 | Luessem | H04W 28/0842 709/239 |
| 2011/0066668 | A1* | 3/2011 | Guarraci | G06F 16/188 707/831 |
| 2011/0320608 | A1* | 12/2011 | Nelakonda | H04L 67/00 709/226 |
| 2012/0082089 | A1* | 4/2012 | Nelakonda | H04L 12/4633 370/328 |
| 2012/0197962 | A1* | 8/2012 | Maenpaa | H04L 67/1065 709/201 |
| 2013/0297606 | A1* | 11/2013 | Tola | H04L 41/12 707/E17.089 |
| 2014/0068224 | A1* | 3/2014 | Fan | G06F 3/0613 711/206 |
| 2014/0122574 | A1* | 5/2014 | Lee | H04L 67/1001 709/203 |
| 2014/0372533 | A1* | 12/2014 | Fu | G06F 9/5072 709/204 |
| 2015/0058967 | A1* | 2/2015 | Ringdahl | H04L 63/0254 726/11 |
| 2015/0095906 | A1* | 4/2015 | Chen | G06F 9/5011 718/1 |
| 2015/0234846 | A1* | 8/2015 | Moore | G06F 16/137 707/747 |
| 2016/0092254 | A1* | 3/2016 | Borra | G06Q 20/085 718/1 |
| 2016/0330136 | A1* | 11/2016 | Saha | H04L 41/0663 |
| 2017/0142613 | A1* | 5/2017 | Singh | H04W 28/0842 |
| 2017/0359217 | A1* | 12/2017 | Ahuja | H04L 63/20 |
| 2018/0109429 | A1* | 4/2018 | Gupta | H04L 43/20 |
| 2018/0136931 | A1* | 5/2018 | Hendrich | G06F 11/30 |
| 2018/0205552 | A1* | 7/2018 | Struttmann | H04L 9/0637 |
| 2019/0028360 | A1* | 1/2019 | Douglas | H04L 41/22 |
| 2019/0045357 | A1* | 2/2019 | Cooper | H04W 76/11 |
| 2019/0098080 | A1* | 3/2019 | Bermudez | H04L 67/1029 |
| 2019/0102435 | A1* | 4/2019 | Bishnoi | G06F 16/24568 |
| 2019/0243547 | A1* | 8/2019 | Duggal | G06F 3/0619 |
| 2019/0243688 | A1* | 8/2019 | Karmarkar | G06F 9/5083 |
| 2019/0243702 | A1* | 8/2019 | Shilane | G06F 11/0709 |
| 2019/0245918 | A1* | 8/2019 | Xu | H04L 63/0869 |
| 2020/0019330 | A1* | 1/2020 | Brandt | G06F 12/0802 |
| 2020/0019476 | A1* | 1/2020 | Arevalo | G06F 12/0815 |
| 2020/0019622 | A1* | 1/2020 | Lu | G06F 16/137 |
| 2020/0110625 | A1* | 4/2020 | Warnicke | H04L 67/1021 |

OTHER PUBLICATIONS

"Notice of Allowance Issued in European Patent Application No. 19804911.6", dated Aug. 10, 2023, 2 Pages.

\* cited by examiner

DISTRIBUTED DATABASE-DRIVEN RESOURCE MANAGEMENT AND LOCKING IN A CLOUD NATIVE MOBILE CORE NETWORK NODE ARCHITECTURE

CROSS-REFERENCE TO RELATED APPLICATIONS

This application is a continuation of U.S. patent application Ser. No. 16/660,538 (the '538 Application) filed on Oct. 22, 2019. The '538 Application claims the benefit under 35 U.S.C. § 119(e) to U.S. Provisional Application No. 62/748,688 filed on Oct. 22, 2018. The aforementioned applications are expressly incorporated herein by reference in their entirety.

TECHNICAL FIELD

The present disclosure relates generally to database management systems in a mobile network cloud native architecture.

BACKGROUND

Network access nodes, such as load balancers, are used in mobile core network architectures. For example, instructions executed by a Mobility Management Entity can be distributed across a set of software instances to ensure efficiency, where each software instance handles a share of the instructions processed by the entire system. Instructions related to the same object, e.g. a User Equipment device ("UE"), should be routed to the same software instance to achieve maximum efficiency. For example, instructions may be identified based on an UE identifier. While one set of instructions may be linked to a particular UE's Temporary Mobile Subscriber Identity ("TMSI"). Another set of instructions, related to the same UE, may be identified based on a Session ID. Ideally, both sets of instructions would be routed (or load balanced) to the same software instance. In existing systems, however, load balancers need access to large tables to identify the link between different identifiers that are related to the same UE. This requirement represents a bottle neck across load balancers that limits scalability due to the size of the tables and the messaging overhead incurred to keep the tables synchronized.

SUMMARY OF THE INVENTION

Embodiments of the present disclosure are directed to providing database management techniques in a mobile network cloud native architecture (e.g. a web-based architecture based on stateless microservices and HTTP-based APIs). In particular, embodiments of the present disclosure provide efficient, distributed database management of non-transitory readable media that includes a memory configured to store information associated with service instance requests including one or more service instance identifier ranges associated with at least one of a plurality of network resources and a processor communicably coupled to the memory that is programmed to execute logical commands stored on the memory. In some embodiments, the processor is configured to receive a first service instance request, determine the first native domain object associated with the first service instance request received at the processor, allocate the plurality of network resources to a plurality of distributed worker instances dependent upon a first native domain object associated with the first service instance request, and assign the first service instance request to a first worker instance based at least on the first native domain object.

In some embodiments, the first worker instance includes at least one microservice instance configured to define at least one service instance block to execute the first service instance request, and a service instance block manager configured to manage the first service instance request in conjunction with subsequent service instance requests associated with the plurality of worker instances. In some embodiments, the processor is further configured to transmit a first service instance log to the memory, including an identifier of both the first native domain object and the first worker instance and assign one or more second service instance requests associated with the first native domain object to the first service instance block, wherein the service instance block manager may dynamically adapt the configuration of the at least one microservice instance. In some embodiments, the processor may assign one or more second service instance requests associated with a second native domain object to at least one of a plurality of second service instance blocks, determine a completion of at least the first service request, and transmit a completion signal associated with the first service request to the second memory following completion of the first service request.

In other embodiments, the system provides distributed allocation from one or more linked resource pools in a manner that guarantees no duplicate allocation, no duplicate freeing, and no resource leakage. In some embodiments, functions related to network elements in a mobile network are managed as a distributed system. Load balancers, or other network resource access points, can distribute work requests to a plurality of containers, virtual machines (VMs), containers on VMs, or software processes (e.g. worker instances) that can perform network element functions by distributing network functions across those network nodes. Work requests can be related to objects (or "domain objects") such as users, UEs, sessions, or interfaces that can be grouped together into logical blocks (or "flexblocks") to distribute work among the plurality of worker instances. Each of the domain objects can be identified by one or more identifiers, which can be used to allocate the domain objects into a series of groups (or "flexblocks"). Each flexblock can be defined by ranges of one or more identifiers. Worker instances can retain exclusive access (or "locks") on one or more flexblocks, thus retaining the exclusive access to the flexblock to perform functions related to the domain objects contained with the flexblock.

In some embodiments, one of a number of distributed network access nodes receives instructions to perform a network element function related to a domain object. For purposes of explanation, the distributed network access node is simply described in the context of a network traffic load balancer, however network access nodes may include a number of types of network nodes that provide the ability to allocate resources from a central pool in a distributed manner not directly tied to load balancing. The load balancer can determine that the instructions are related to a block of domain objects based on an identifier contained within the instructions. The load balancer can make this determinization by consulting a table or database that maps various ranges of identifiers to specific flexblocks. That is, each domain object can be keyed to a flexblock based on any number of identifiers. Flexblocks are defined according to different ranges for each identifier and identifiers can key to the same flexblock. If the identifier falls within any range of values allocated to a flexblock, then the domain object associated with that identifier belongs to the flexblock. Each domain object and flexblock can therefore be identified according to more than one range of identifier or number space. The load balancer can also determine that the flexblock to which a particular instruction maps is locked by a specific worker instance based on information stored within a table or database.

If the identifier falls within a range of identifiers designated by a flexblock, the load balancer can forward the work request to the worker instance that has a current lock on the flexblock. The worker can perform the functions called for in the instructions and safely write the state of the domain object to a database.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

The present disclosure relates to techniques for managing databases in cloud native architectures including, e.g., telecommunications networks. Functions performed by various network elements can be partitioned and distributed using the techniques described herein. These functions can be grouped together based on logical groups of objects (or "domain objects") to which the functions apply. For example, functions related to a set of domain objects such as users, sessions, IP interfaces, or durable times can be grouped together. Distributed workers can claim access to a group, or "flexblock," of domain objects and perform all functions related to that group of domain objects. Identifiers related to those domain objects can be strategically allocated such that contiguous blocks of identifiers (corresponding to domain objects) map to the same flexblock. All identifiers related to a domain object map to the same flexblock. Thus, a load balancer need only resolve whether the identifier corresponding to a requested function falls within a range of identifiers. The load balancer need not retain detailed information necessary for mapping an identifier directly to a domain object. The load balancer can determine that an identifier corresponding to the requested function is maps to particular flexblock based on a range of identifiers and route the requested function to a worker instance that currently holds the flexblock.

Each domain object can correspond to a primary identifier and one or more secondary identifiers. Each identifier can be mapped onto a predefined range based on the number space corresponding to that type of identifier. The predefined range for each identifier maps to a flexblock that corresponds to a group of domain objects. Thus, a load balancer, or other distributed network access point, upon receiving an instruction or work request, can route the instruction or work request to a worker instance simply by determining the range of identifiers into which it falls. Moreover, by strategically allocating identifiers related to a domain object such that related identifiers fall within contiguous blocks, network operators can ensure that work requests related to the same domain object can be efficiently routed to the same distributed worker instance without maintaining large, complex tables at the load balancer.

Each domain object can also include one or more child objects. Each of the child objects can also correspond to a primary identifier and one or more secondary identifiers. All such identifiers map to the same flexblock because they correspond to the same domain object. For example, PDN sessions can be a type of domain object. Each PDN session may be identified based on a particular identifier (e.g. a Diameter session ID). Within the number space for that identifier, a range of values can define a block of PDN sessions, forming a flexblock. Upon receiving an instruction involving that particular identifier (e.g. the Diameter session ID), the load balancer can determine that the identifier falls within the range of identifiers mapping to flexblock 1. The load balancer can then determine that a worker instance, e.g. worker instance 1, currently has a lock on flexblock 1. The instruction is then forwarded to worker instance 1.

A PDN session may be associated with one or more bearers. Each of the bearers is a child object. Each child object may have a primary identifier and one or more secondary identifiers. Each of the identifiers belongs to a predefined range of values that also maps to the same block of domain objects (here, PDN sessions). Thus, the load balancer may receive an instruction involving an identifier corresponding to one of the PDN session bearers. Upon receiving an instruction involving that identifier, the load balancer can determine that the identifier falls within the range of identifiers mapping to flexblock 1. The load balancer can then determine that a worker instance, e.g. worker instance 1, currently has a lock on flexblock 1. The instruction is then forwarded to worker instance 1. Each of the bearer child objects corresponds to the PDN session domain object from which the sessions were derived. Thus, each instruction related to one of the bearers belongs to the same flexblock as the PDN session to which the bearer belongs and is properly routed to the same worker instance that handles instructions for the PDN session to which the bearer belongs.

Each of the identifiers is allocated such that identifiers related to a domain object map to the same flexblock.

Certain identifiers are allocated separately and cannot be organized into flexblocks based on a contiguous number space before allocation. For example, International Mobile Subscriber Identity ("IMSI") and International Mobile Equipment Identity ("IMEI") are either permanent or semi-permanent identifiers that cannot be grouped dynamically by the network operator. Unlike other identifiers discussed above, the number space and allocation are not controlled by a network operator and cannot be allocated contiguously in conjunction with other related identifiers. Thus, it may be impossible to efficiently map ranges of IMSI or IMEI identifiers at the load balancer, because ranges of these values are not contiguously allocated. In some embodiments, a load balancer distributes, to a worker instance, the resolution of work requests related to externally allocated identifiers. For example, if a load balancer receives a work request that is associated with an IMSI or IMEI, the load balancer will distribute this request to a worker instance using load balancing techniques. The worker instance receiving this work request will access one or more databases to determine the domain object associated with this externally allocated identifier, to determine which flexblock is associated with the domain object, and to determine which worker instance currently has a lock on the flexblock. Finally, the work request is routed to the appropriate worker instance to complete the requested task. In this way, the resolution of externally allocated identifiers is distributed and the load balancer need not maintain detailed mappings of the domain objects.

Domain objects can be stored in a database. Flexblocks are then defined to logically group domain objects. As discussed further below, worker instances can exclusively lock entire flexblocks and perform functions on all domain objects contained therein such that they can be safely cached and serviced as a group. Identifiers that are related to the same domain object can be strategically instantiated such that the identifiers related to the same domain object map to the same flexblock.

Each flexblock maintains state information to identify the objects contained within. For example, a flexblock that includes a group of users may also manage each session related to each user within the flexblock. Workers (or microservice instances) are responsible for performing the functions related to the domain objects and can compete for exclusive access to flexblocks and all of the objects contained within. Scalability is improved by delegating the management of complex state information to the worker instances handling each individual flexblock rather than maintaining that information globally, e.g. at a load balancer. Efficiency is improved by locking access to each flexblock and reducing the need for database access during the performance of each job.

Flexblocks are logical groups of domain objects used for organizing functions to be performed by various network elements. For example, a flexblock can be based on a fixed number of User Equipment devices (UEs). In this case, the domain object is the UE. UEs can be identified based on a Globally Unique Temporary Identifier (GUTI), a Packet Temporary Mobile Subscriber Identifier (P-TMSI), UE ID, Next Generation Application Protocol (NGAP) ID, or Tunnel Endpoint Identifier (TEID). Flexblocks can also be defined based on other groups of domain objects. For example, a domain object can also be a session, an interface, a durable time or any other object that can be logically grouped to separate and distribute work among a plurality of workers in a distributed system.

Flexblocks can be defined based on a fixed number of sessions (e.g. using a Packet Forwarding Control Protocol Secure Element Identifier (PFCP SEID), a GPRS Tunneling Protocol User Plane (GTP-U) TEID, a Session Management Function Protocol Data Unit (SMF PDU) Session ID, a PDU Session IP Address, or a GPRS Tunneling Protocol User Plane Control Plane (GTP-C) TEID). Flexblocks can be defined based on a fixed number of IP interfaces (e.g. using identifiers such as interface-id, Border Gateway Protocol Association ID (bgp-association-id), and Bidirectional Forwarding Detection Session ID (bfd-session-id)). Flexblocks can also be defined based on a fixed number of durable times (e.g., using identifiers such as a timer-id).

A flexblock can be used to track timers or "durable timers." For example, a microservice that is managing a particular flexblock may flush certain objects from its local memory to be stored in a database. A timer may be maintained to determine when the microservice must retrieve that object from the database for servicing. To properly maintain such timers in a stateless microservice architecture as described in this disclosure, these timers can be maintained as domain objects in their own flexblock. Flexblocks storing durable timer domain objects are then serviced by microservice instances. Each timer can be assigned a timer-ID, allocated to a flexblock, and managed by a microservice instance. For example, microservice instance A may own the flexblock containing a domain object, Session X. Microservice instance A may decide to write information regarding Session X to a database and set a Timer Y to determine when to next retrieve Session X from the database. However, once microservice instance A writes Session X to the database, it maintains no context for Session X locally. Thus, there is no context with which to maintain Timer Y. Instead, Timer Y can be allocated an identifier and grouped together with other timers to be maintained in a flexblock that is serviced by another microservice instead (e.g. Microservice Instance B). In this case, microservice instance B may have a lock on a flexblock containing a group of timers that includes Timer Y. Microservice B will monitor Timer Y and notify Microservice A when Timer Y is due. In this manner, timers can be maintained using the stateless microservice architecture.

Domain objects can be mapped to a particular flexblock based on one or more identifiers as discussed further below. For example, if the flexblock is based on UEs, GUTI values within a certain range may be allocated to flexblock 1. In this example, objects associated with UEs with GUTI values from that range are also allocated to flexblock 1. In some embodiments, other identifiers associated with those UEs can also be mapped to the same flexblock. In this way, the domain object may function as a primary key and the other identifiers function as a secondary key to assign incoming control requests with the appropriate flexblock. For example, TMSI values or TEID values associated with the same domain objects would also map to flexblock 1. Thus, multiple number ranges related to the domain object are mapped to the same flexblock. Each of the number ranges can, for example, identify the same domain object contextually. For example, other objects associated with these UEs may include, for example, sessions or bearers associated with the UEs. These sessions or bearers are identified based on their own number ranges that are mapped to the same flexblock during allocation of the sessions or bearers.

In some embodiments, flexblocks are designed to support a fixed number of domain objects. For example, each flexblock can be designed to support 1,000 UEs. In this example, if a work request is received, the load balancer need only resolve which group of 1,000 UEs the work request is directed toward. It need not resolve the specific UE or session. Thus, the load balancer need not maintain tables that contain the 1-to-1 mappings between each identifier and each domain object. The load balancer need only contain tables mapping each identifier to a group of domain objects (e.g. the flexblock). Once the load balancer determines which group of 1,000 UEs is related to the identifier, it can direct the work request toward a worker instance that currently owns the flexblock that contains the group of 1,000

UEs. Detailed resolution of the work request and manipulation of the domain object is handled at the worker instance. The load balancer need only determine which range of identifiers is implicated by a particular incoming request. Each range is mapped to a flexblock and each flexblock is serviced by a microservice instance that can resolve the identifier-to-domain object mapping to resolve the instructions. The load balancer need not determine which domain object is implicated by a particular incoming request.

Resources in a flexblock can be modified after the creation of the flexblock. For example, a flexblock may be initialized for 1000 sessions. The flexblock may have 1000 TEIDs and 1000 session IDs. Since any given session may have a variable number of TEIDs (e.g., depending on whether the session requests dedicated bearers), more TEIDs may be needed. More TEIDs may be allocated and bound to the existing flexblock if more are needed. Thus, the flexblocks are flexible.

Flexblocks can be initialized to handle a predetermined number of domain objects. As users come into the system, domain objects and number spaces are allocated to new users based on the predetermined number of domain objects. In some embodiments, a threshold can be set such that if the number of unused domain object slots reaches a lower threshold, a new flexblock can be created to handle new domain objects.

The predetermined number can be set based on application layer knowledge about the usage of identifiers for the domain object, the number space associated with a domain object, and the characteristics of the applications for which the domain object is used. For example, if the network tends to cycle through a particular identifier quickly, a larger initial size can be set. On the other hand, if the network is slow to cycle through an identifier value, a smaller initial size can be set for the flexblock. The predetermined number can also be set based on the processing capacity of a worker instance or intended processing throughput for a worker instance.

Worker instances, or microservices, can be containers, virtual machines (VMs), containers on VMs, or software processes that are responsible for performing functions on the objects represented in a flexblock. Worker instances can compete for exclusive access to flexblocks based on database tables by claiming and locking a flexblock. Collisions among worker instances competing for the same flexblock can be addressed through a conditional write scheme. For example, potential claimants (e.g. worker instances) can read the state of a flexblock from a database prior to claiming a lock on the flexblock. Claimants must check that their copy matches the database copy prior to performing the write function to claim a flexblock. Thus, a claimant's attempt to claim a flexblock will fail if another potential claimant claimed the flexblock first. In this way, only one claimant may successfully claim a flexblock and collisions can be avoided. Database optimistic locking can be used to ensure race-free claiming procedures. A lock on a flexblock is a lock on all of its objects.

Once a worker instance retains a lock on the flexblock, the worker instance can perform all functions related to the objects contained within the flexblock. For example, if a load balancer receives a request to perform work, the request can include an identifier (e.g. a TMSI) that relates to a domain object (e.g. a UE). The load balancer, other distributed network access point, can determine which flexblock is currently associated with that domain object through the worker instance based on a database lookup and a specified range into which the identifier falls. The load balancer can then direct the work request to the worker instance that currently retains the lock on the flexblock. Similarly, the load balancer may receive another work request that includes a different identifier (e.g. a bearer ID) that is also related to the same domain object. The load balancer can determine which flexblock is associated with that domain object based on a database look up and a specified range into which the different identifier falls. The load balancer can then direct this second work request to the worker instance that currently retains a lock on the flexblock. Identifiers can be allocated and flexblocks can be created such that work requests related to the same domain objects are designated for the same flexblocks. Thus, in this example, the two work requests map to the same flexblock and worker instance because they relate to the same domain object. Efficiencies are achieved by allocating ranges of various identifiers related to the same domain objects (e.g., UEs) to the same flexblocks. Work requests related to those domain objects are later routed to the same worker instances because the identifiers all map to the same flexblocks. Cache safety is also promoted because work related to a particular domain object is contained within a flexblock that is locked by a single worker instance. Each worker instance can safely conduct operations on a domain object contained within any of its locked flexblocks without fear that another worker instance is simultaneously making changes to the same domain object. When a function is completed, the worker instance can safely write back to the database regarding changes made to the domain object.

A worker instance may release its lock on a flexblock voluntarily, to provide load balancers an opportunity to rebalance unlocked flexblocks, or by command, to facilitate rebalancing. One such mechanism may be through a durable timer, as explained with respect to FIG. 3B below.

If a worker instance fails, load balancers can distribute its work to other worker instances. Other worker instances may recognize that the former lock holder is no longer active and compete to claim the lock for the relevant flexblock. When a worker fails, no recovery of that worker is attempted. Instead, the flexblocks previously locked by that worker instance become available for claiming by other worker instances. Thus, failure recovery is handled in a distributed manner and there is no need for a dedicated back up worker instance.

If a load balancer sends a work request to a particular worker under the incorrect assumption that the particular worker owns a flexblock, that worker can forward the work to the appropriate worker. In some embodiments, the worker instance may consult one or more databases to determine which worker current owns the relevant flexblock before forwarding the work request to that worker instance.

Distributed systems according to some embodiments described herein can be considered in two stages, a first stage and a second stage. At the first stage (e.g. a load balancer stage), an incoming instruction related to a particular domain object (e.g. related to a particular UE) can be keyed to a particular flexblock based on an identifier. For example, an incoming instruction may use a TMSI value. If the TMSI value fits within a certain range of TMSI values designated for flexblock 1, the incoming instruction will be directed toward the current worker instance that has a lock of flexblock 1. At the second stage (e.g., the worker instance that currently owns flexblock 1) the incoming instruction can be mapped to the UE based on the TMSI value. Thus, the domain object is resolved at the second stage, not at the first stage. The second stage is also responsible for servicing the incoming instruction and writing any resulting changes to the domain object back to a database. The first stage need not retain or process any information beyond the proper flexblock for the particular identifier based on a predefined range, thus reducing the need to maintain state information at the first stage. The first stage need only resolve the number range for a particular domain object. The remaining complexity is offloaded from the first stage and disseminated across distributed worker instances at the second stage. This promotes scalability.

The relationship between claimants (worker instances) and the flexblocks can be maintained in a first database. For example, tables can be maintained in a first database indicating which flexblocks are owned by which claimants. Load balancers can consult these tables to determine where to route work requests. The domain objects can be maintained in a second database. For example, worker instances can retain a lock on a particular flexblock that comprises domain objects. When a worker instance receives a request to perform functions related to domain objects in its locked flexblock, the worker instance can immediately perform those functions and subsequently write the results back to the second database. In this way, the locked flexblocks serve as a safely cached copy of the domain objects on which the worker instance can operate.

Figure 1:
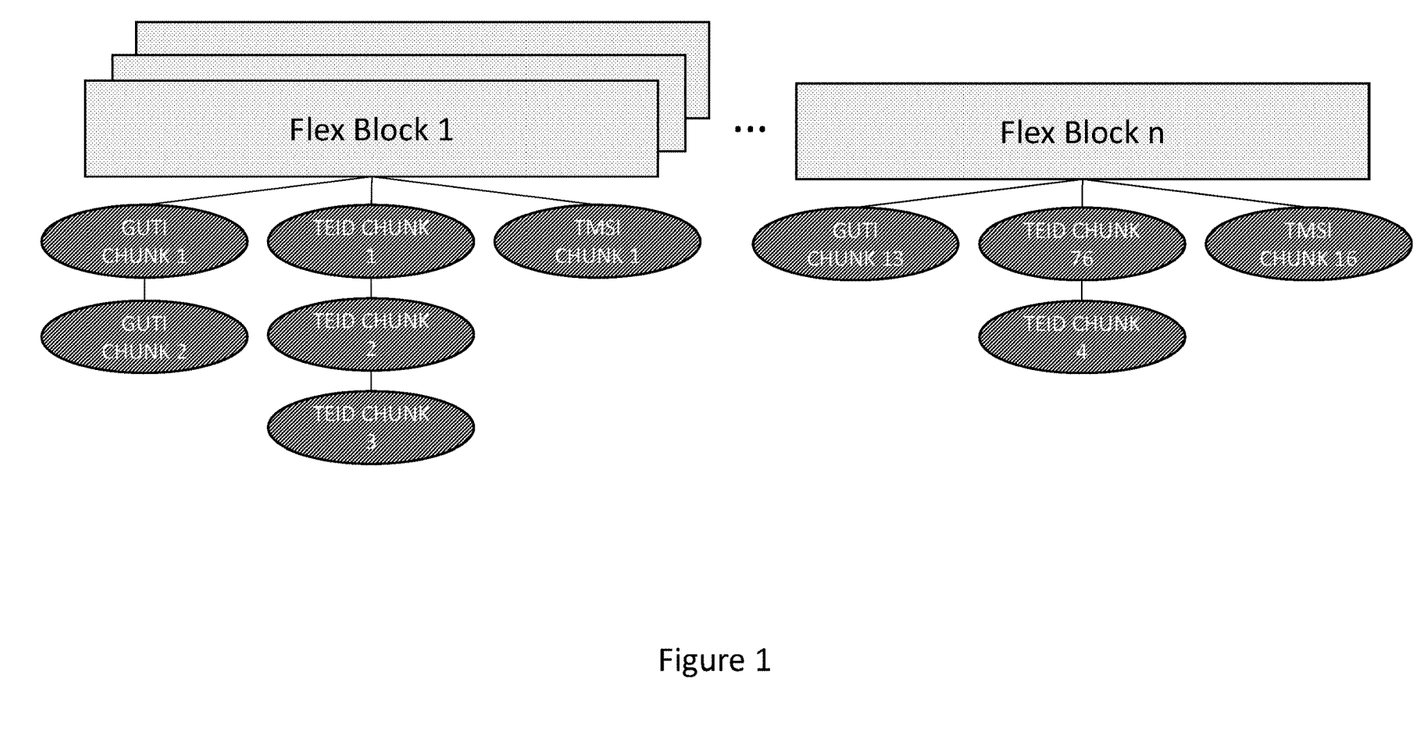
FIG. 1 is an exemplary embodiment of flexblocks representing multiple number spaces.

FIG. 1 illustrates an exemplary configuration of flexblocks according to some embodiments. As shown, flexblock 1 contains various number spaces according to different types of identifiers. For example, GUTI identifiers is divided into several number spaces. Thus, GUTI CHUNK 1 represents a first range of GUTI values. GUTI CHUNK 2 represents a second range of GUTI values. Similarly, Flexblock 1 contains number spaces for TEID values and for TMSI values. As discussed above, work requests containing identifiers falling within GUTI CHUNK 1 will map to Flexblock 1. Load balancers receiving such a work request can route the request to a worker instance that current holds a lock on Flexblock 1. As further illustrated by Flexblock n, there can be many flexblocks, each of which represent different number spaces. In this example, Flexblock n contains GUTI CHUNK 13, TEID CHUNK 76, TEID CHUNK 4, AND TMSI CHUNK 16. In some embodiments, the various number spaces are instantiated such that identifiers related to the same domain object will map to the same flexblock. In this way, processing related to a single domain object will be performed by a single worker instance having a lock on the appropriate flexblock.

Figure 2:
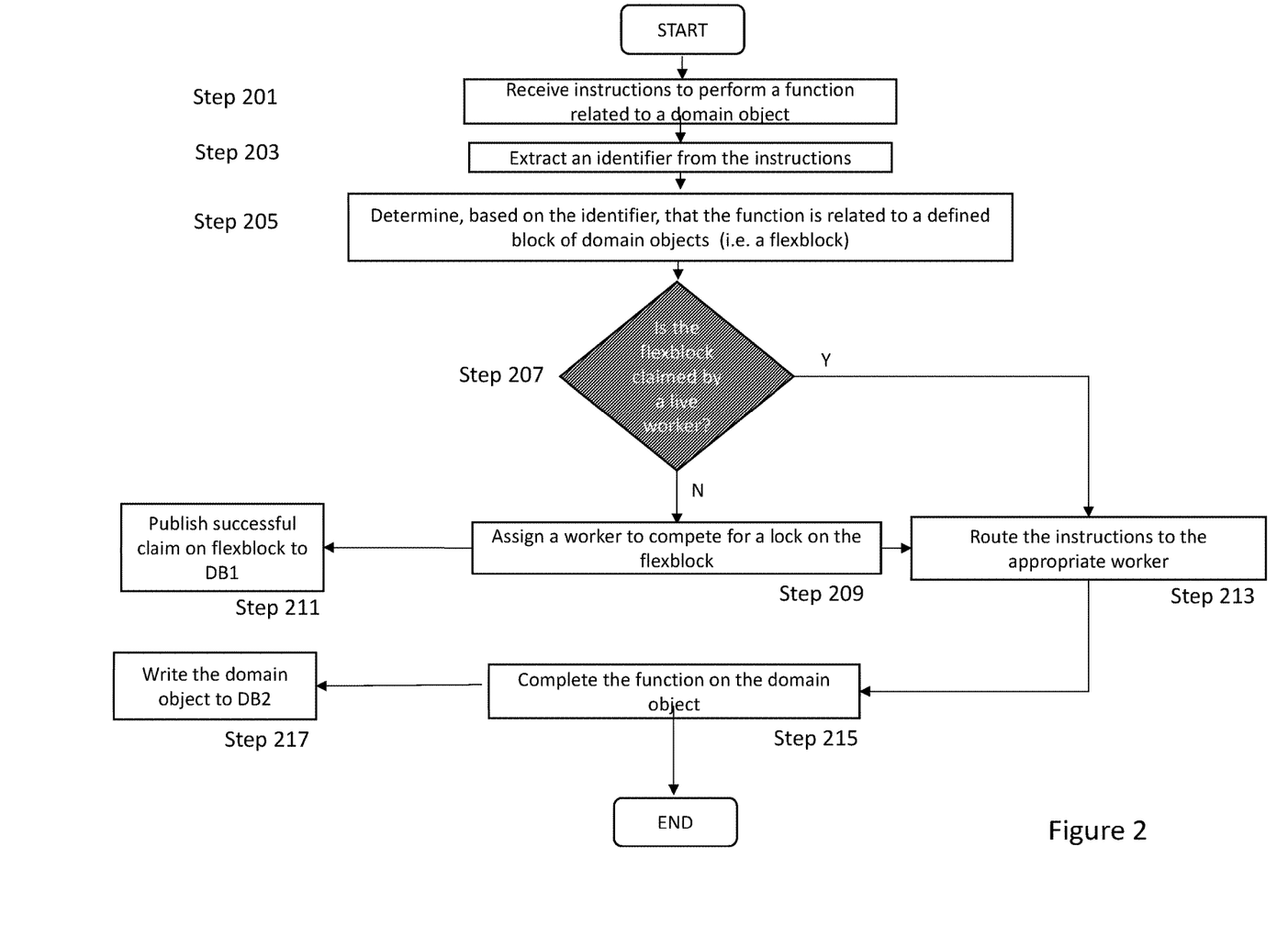
FIG. 2 is a flow diagram that illustrates an exemplary procedure for routing instructions to perform network element functions.

FIG. 2 is a flow diagram illustrating an exemplary procedure for routing instructions to perform network element functions. At Step 201, a load balancer receives instructions to perform a network function related to a domain object. At Step 203, the load balancer extracts an identifier from the instructions. At Step 205, the load balancer determines, based on the identifier, whether the function is related to a range of identifiers belonging to a defined block of domain objects (e.g. a flexblock). This determination can involve reference to a table or database. In some embodiments, this determination can involve mapping the extracted identifier to a range of identifiers within a certain number space. For example, if an identifier is binary, the range to which it belongs can be determined by applying a right shift operation that removes a certain number of the right most bits.

At Step 207, the load balancer can determine whether the flexblock is claimed by a worker instance. This determination can involve reference to a table or database (in some embodiments, Database 407). If the flexblock is not claimed by a worker instance or is claimed by a failed worker instance, the load balancer may assign a new worker instance to compete for exclusive access (or a "lock") on the flexblock at Step 209. In some embodiments, this assignment can occur using a hashing scheme, round robin scheme, or other load balancing algorithm. If the new worker instance is successful in claiming a lock on the flexblock, the worker instance will publish this information to the table or database (in some embodiments, Database 407) at Step 211. If two load balancers assign different worker instances to claim the same flexblock, race conditions may ensue. Thus, worker instances must compete for exclusive access to the flexblock. As discussed above, this can be implemented through a conditional write scheme.

At Step 207, if the load balancer determines that the flexblock is already claimed by a live worker instance, it can route the instructions directly to the live worker instance at Step 213. At Step 215, the appropriate worker instance will complete the processing called for in the original instructions and write the result of the processing back to a database at Step 217.

Figure 3A:
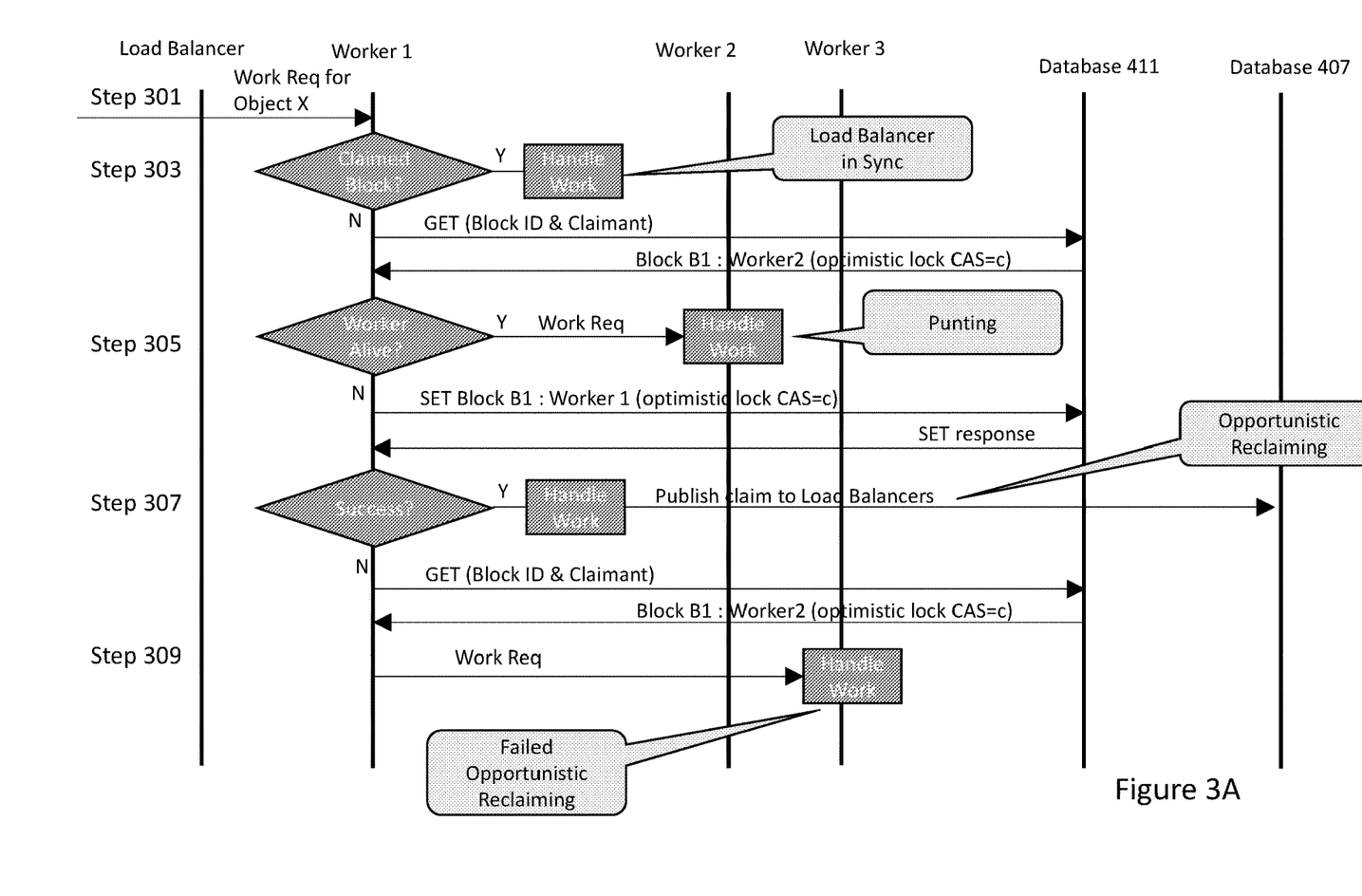
FIG. 3A is a call flow diagram that illustrates an exemplary load balancing procedure for routing instructions from worker instances to perform network element functions.

FIG. 3A is a call flow diagram that illustrates an exemplary load balancing procedure for routing instructions to perform network element functions. At Step 301, a work request is received involving object X. If object X belongs to a flexblock claimed by Worker 1, Worker 1 will handle the work in the request (Step 303). If the flexblock to which object X belongs is claimed by another worker, e.g. Worker 2, Worker 1 will forward (or "punt") the work request to Worker 2 (Step 305). Worker 2 subsequently handles the work in the request. If worker 2 is not alive, however, Worker 1 may claim the flexblock to perform the work itself (i.e. "opportunistic reclaiming"). If worker 1 successfully claims the flexblock, it will perform the requested functions (Step 307). If worker 1 cannot successfully claim the flexblock, another worker (e.g., worker 3) may claim the flexblock and perform the requested functions (Step 309).

In some embodiments, a container-orchestration engine handles the lifecycle management of microservice worker instances. The container-orchestration engine maintains information about the state of each worker instance. For example, if a worker has failed, the container-orchestration engine will update its own records. Other workers can subscribe to the information contained in the container orchestration engine such that new information about workers is published to other workers. Workers may consult this information about other worker instances during e.g., punting scenarios as described above. In some embodiments the container-orchestration engine can utilize a Kubernetes, etc., system.

Figure 3B:
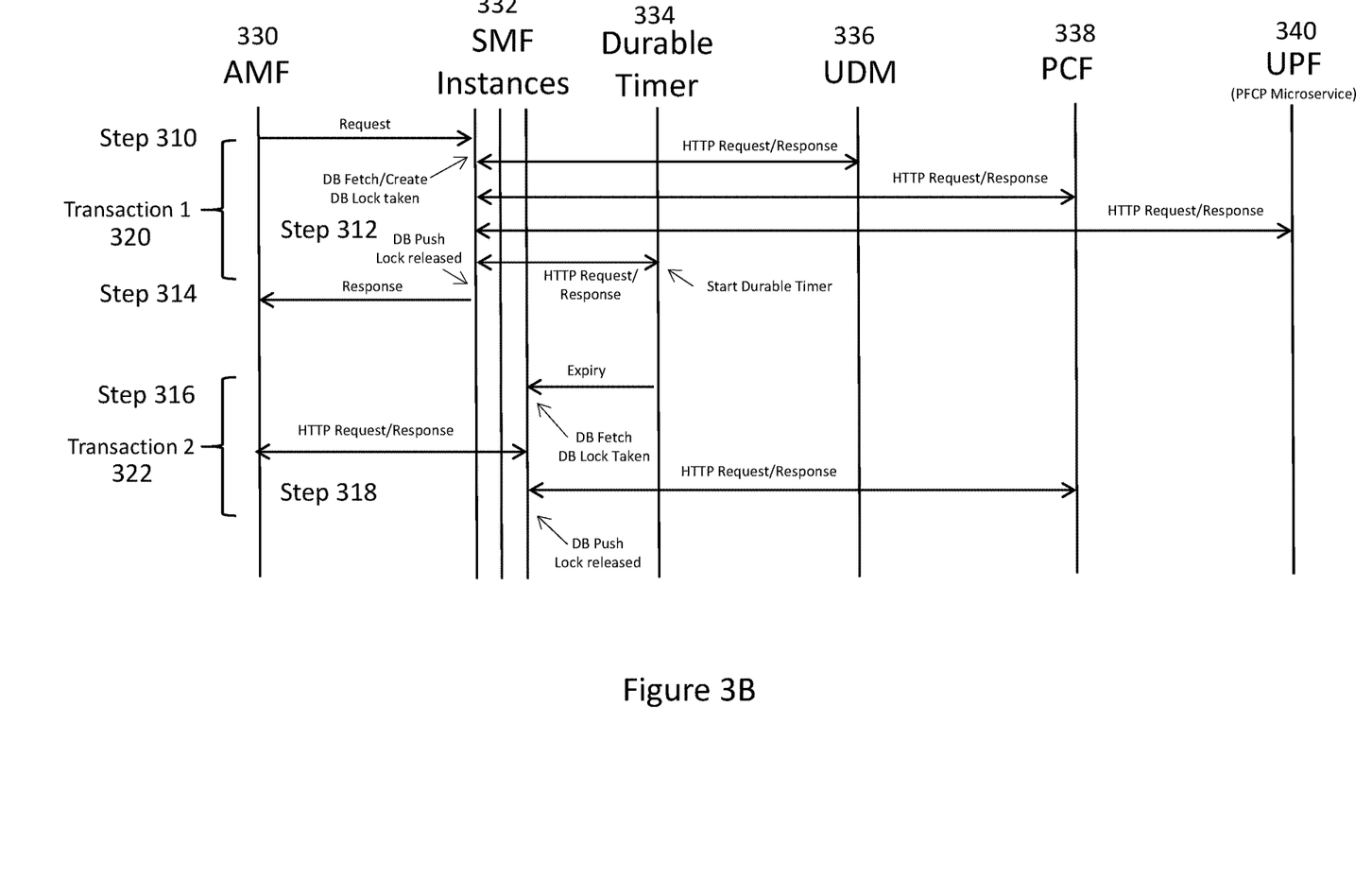
FIG. 3B is a call flow diagram that illustrates an exemplary load balancing procedure for routing instructions to network nodes to perform network element functions.

FIG. 3B is a call flow diagram illustrating the procedure for a series of service requests or transactions according to an embodiment of the present disclosure. As illustrated, a first transaction 320 and a second transaction 322 may be received from a load balancer and executed by the system, shown in FIG. 4, using a series of processes that take into account AMF, SMF instances, a durable timer, UDM, PDF, and UPF functions. In some embodiments, SMF instances may be the same worker instances described above with respect to FIG. 3A. First transaction 320, for example, may include a request from a UE for services executed within the network. Although FIG. 3B identifies the structures of a 5G system architecture in the present disclosure, the description of FIG. 3B is illustrative and the present embodiment may be implemented in similar architectures corresponding at least with a 4G system and the associated equivalent network elements as those displayed in FIG. 3B.

At step 310, the request from AMF 330 is received by SMF instances 332, which triggers a database fetch/create operation for the request. At step 312, SMF instances 332 may assign or associate the request with a specified worker instance, as described above, based upon a specified domain object. The specified worker instance may include a number of container images, or Pod, that includes numerous microservice instances responsible for executing distinct functions associated with the request. In some embodiments, at least one of the microservice instances may include a flexblock manager responsible for executing requests received at the worker instance from the load balancer.

Additionally, SMF 332 may execute the specified worker instance, allowing the worker instance to determine whether the request is associated with a locked flexblock by determining the state of the flexblock from a database, as described above. In this way, for example, the locked flexblock may be a slaved flexblock instance responsible for a specific set of blocks monitored by the specified worker instance. If the request is associated with a locked flexblock, the specified worker instance may assign the request to the locked flexblock associated with the request domain object. If the request is not associated with the locked flexblock, the specified worker instance may assign the request to a subsequent flexblock or transfer the request to a second work instance. In addition, a locked flexblock, via the specified worker instance, may be dynamically adapted to incorporate more or less network resources as required by incoming requests associated with the domain object.

Having determined the nature of the request, SMF 332, via the specified worker instance, may route the request to, and receive response from, a specified network node to carry out the request associated with microservice instance included as a part of the specified worker instance, such as any one of UDM 336, PCF 338, or UPF 340. For example, as shown in FIG. 3B, UPF 340 may execute the control request functions associated with a PFCP microservice as a part of the specified worker instance.

SMF 332, by way of the specified worker instance, may also determine a durable timer 334 for the assigned flexblock, whether locked or not. As explained above, a durable timer may be maintained to determine when the microservice must retrieve that object from the database for servicing. An operator may define the durable timer to be a relative time, for example, a time period between initial and subsequent requests or a set time frame beyond when a first request is initiated by the load balancer. For example, as shown in FIG. 3B, durable timer 334 may be triggered at the same instance that the request is forwarded to any one of UDM 336, PCF 338, or UPF 340. At step 314, SMF instances 332 may transmit a response to AMF 330. The response at step 314 may include a completion signal or the data sought by the request.

At step 316, second transaction 322 includes a second request sent from AMF 330 to SMF instances 332. Second transaction 322 may, for example, be a second control request from the same UE that triggered first transaction 320 or alternatively, second transaction 322 may be a request from a second UE. Second transaction 322, received at SMF instances 332 may be directed to a separate worker instance than first transaction 320 until the expiration of durable timer 334, described above. In some use cases, the second request may be associated with a similar domain object as the first request, but require the second worker instance because the flexblock associated with the first worker instance was prescriptively locked. In other use cases, the second request may be associated with an entirely separate domain object and, therefore, assigned to a separate worker instance than the first request, after which the separate worker instance may be locked to the particular flexblock using the same determination as described above with respect to step 312. Similar to the first request, at step 318, SMF instances 332, via a second worker instances, may route the request to, and receive response from, a proper network node to carry out the request associated with microservice instance included as a part of the specified worker instance, such as, for example, PCF 338.

Figure 4:
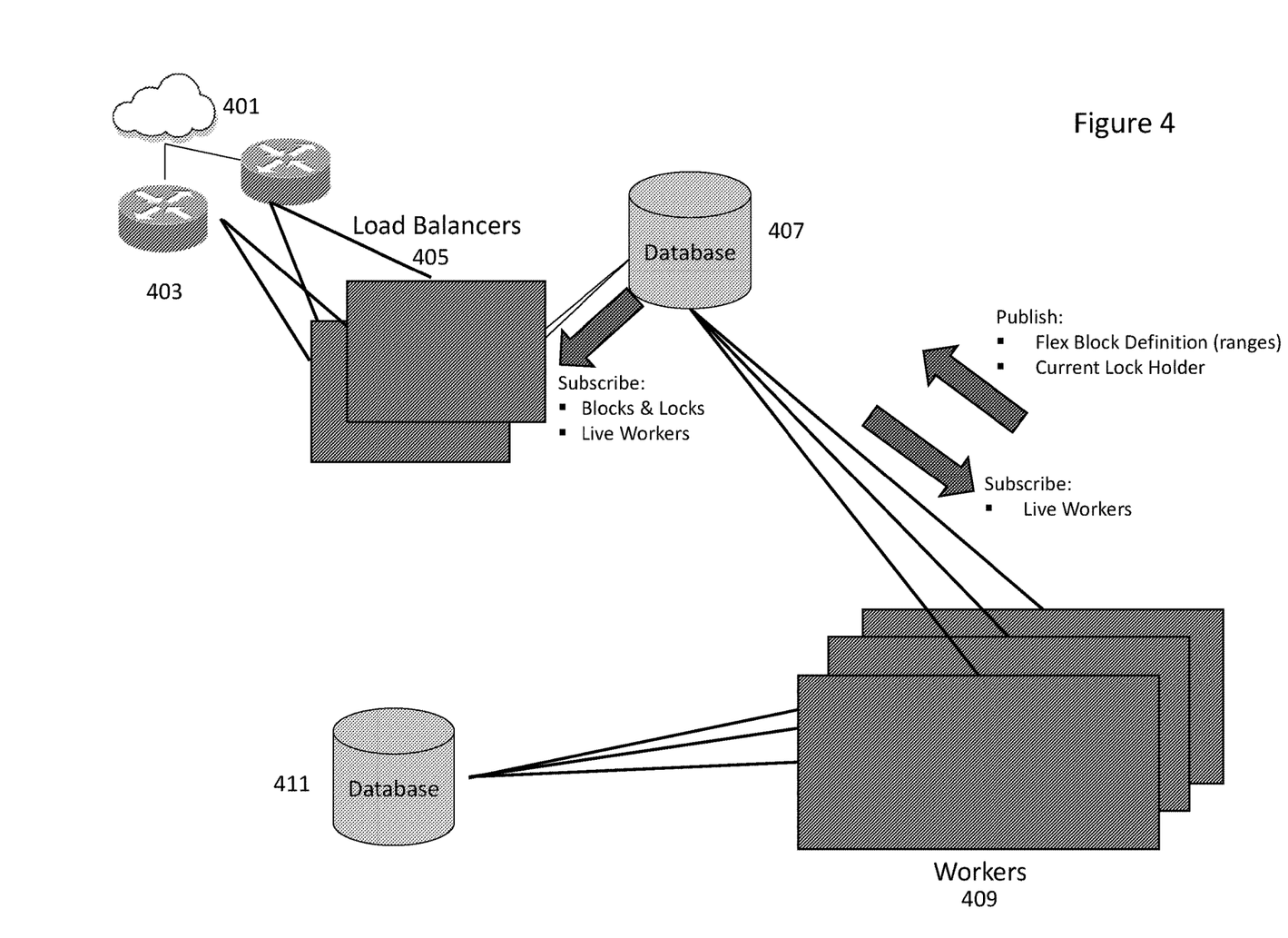
FIG. 4 is a system diagram illustrating the relationship between load balancers, worker instances, and the databases used to store information related to the flexblocks and domain objects.

FIG. 4 is a system diagram illustrating the relationship between load balancers, worker instances, and the databases used to store information related to the flexblocks and domain objects. As illustrated, instructions may be routed from Internet 401 through one or more provider edge routers 403 to a set of load balancers 405. Database 407 stores information related to flexblock definitions (e.g. the identifier number space ranges that map to each flexblock) as well as the current lock holders for each flexblock. Database 407 can also store information related to which workers are live. In some embodiments, database 407 can be implemented as an etcd system or a database optimized to efficiently publish change notifications. Load balancers 405 can subscribe to this information and store cached copies of this information. When work requests arrive at the load balancer, each load balancer can use this cached information to properly route the work requests as discussed above. Workers 409 are responsible for performing work functions and can publish information about flexblock definitions and current block holders to Database 407. Upon completing tasks related to domain objects, Workers 409 can write the state of the domain object to database 411. In some embodiments, database 411 can be a large, dynamically scalable database. For example, database 411 can be implemented as a MongoDB that stores ASCII JSON.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims.

The invention claimed is:

1. A method performed by a network device on a cloud computing system, the method comprising:
   maintaining a record of logical blocks including discrete ranges of instance identifiers associated with blocks of domain objects assigned with sets of worker instances;
   receiving an instance request indicating a function to perform with respect to a domain object, the instance request being associated with an instance identifier;
   determining that the instance identifier falls within a first discrete range of instance identifiers from the record of logical blocks;
   routing the instance request to a worker instance from a first set of distributed worker instances being assigned to perform functions related to domain objects indicated within the first discrete range of instance identifiers, wherein the worker instance executes the instance request by performing the function; and
   causing an instance log to be stored to a database, the instance log including identifiers for the domain object and the worker instance.

2. The method of claim 1, wherein the worker instance retains exclusive access to the logical blocks to which the worker instance is located to perform functions related to the domain objects contained within the logical blocks.

3. The method of claim 2, wherein the record of logical blocks includes information associating the instance identifiers with corresponding blocks of domain objects without storing additional information associated with web sessions, users associated with the web sessions, or functionality of domain objects.

4. The method of claim 1, wherein the worker instance includes an instance of a microservice configured to execute the instance request for the indicated function.

5. The method of claim 4, wherein the worker instance includes a service instance block manager configured to manage the first instance request in conjunction with subsequent service instance requests including associated instance identifiers that fall within the first discrete range of instance identifiers from the record of logical blocks.

6. The method of claim 1, wherein the discrete ranges of instance identifiers associated with blocks of domain objects include one or more of:
   a range of associated user identifiers;
   a range of associated session identifiers;
   a range of associated internet protocol (IP) interfaces; or
   a range of timestamps associated with a plurality of instance requests.

7. The method of claim 1, wherein the first set of distributed worker instances include a plurality of microservices being associated with the first discrete range of instance identifiers and configured to execute a variety of instance requests.

8. The method of claim 1, wherein the discrete ranges of instance identifiers include ranges of contiguous identifier values corresponding to identifiers of domain objects.

9. The method of claim 1, wherein the blocks of domain objects include mobile network cloud-native domain objects associated with a web-based architecture.

10. The method of claim 1, wherein a first block of domain objects associated with the first discrete range of instance identifiers includes a maximum number of service instances associated with the instance request.

11. The method of claim 1, further comprising assigning the worker instance to the first set of distributed worker instances associated with the first discrete range of instance identifiers based on:
   receiving the instance request and;
   identifying that a type of distributed worker instance associated with the function has not been assigned to the first discrete range of instance identifiers.

12. A system for efficient database management of non-transitory readable media, the system comprising:
   a memory configured to store information associated with service instance requests including one or more service instance identifier ranges associated with at least one of a plurality of network resources; and
   a processor communicably coupled to the memory, the processor programmed to execute logical commands stored on the memory, the processor configured to:
      maintain a record of logical blocks including discrete ranges of instance identifiers associated with blocks of domain objects and for which sets of worker instances have been assigned;
      receive an instance request indicating a function to perform with respect to a domain object, the instance request being associated with an instance identifier;
      determine that the instance identifier falls within a first discrete range of instance identifiers from the record of logical blocks;
      route the instance request to a worker instance from a first set of distributed worker instances being assigned to perform functions related to domain objects indicated within the first discrete range of instance identifiers, wherein the worker instance executes the instance request by performing the function; and
      cause an instance log to be stored to a database, the instance log including identifiers for the domain object and the worker instance.

13. The system of claim 12, wherein the record of logical blocks is maintained on a network traffic load balancer, and wherein record of logical blocks includes information associating the instance identifiers with corresponding blocks of domain objects without storing additional information associated with web sessions, users associated with the web sessions, or functionality of domain objects.

14. The system of claim 12, wherein the distributed worker instance includes an instance of a microservice configured to execute the instance request for the indicated function, and wherein the worker instance includes a service instance block manager configured to manage the instance request in conjunction with subsequent service instance requests including associated instance identifiers that fall within the first discrete range of instance identifiers from the record of logical blocks.

15. The system of claim 12, wherein the discrete ranges of instance identifiers associated with blocks of domain objects include one or more of:
   a range of associated user identifiers;
   a range of associated session identifiers;
   a range of associated internet protocol (IP) interfaces; or
   a range of timestamps associated with a plurality of instance requests.

16. The system of claim 12, wherein the blocks of domain objects include mobile network cloud-native domain objects associated with a web-based architecture.

17. A non-transitory computer-readable medium storing instructions thereon that, when executed by at least one processor on a network traffic load balancer, causes the network traffic load balancer to:
   maintain a record of logical blocks including discrete ranges of instance identifiers associated with blocks of domain objects and for which sets of worker instances have been assigned;
   receive an instance request indicating a function to perform with respect to a domain object, the instance request being associated with an instance identifier;
   determine that the instance identifier falls within a first discrete range of instance identifiers from the record of logical blocks;
   route the instance request to a worker instance from a first set of distributed worker instances being assigned to perform functions related to domain objects indicated within the first discrete range of instance identifiers, wherein the worker instance executes the instance request by performing the function; and
   cause an instance log to be stored to a database, the instance log including identifiers for the domain object and the worker instance.

18. The non-transitory computer-readable medium of claim 17, wherein the record of logical blocks is maintained on a network traffic load balancer.

19. The non-transitory computer-readable medium of claim 17, wherein the distributed worker instance includes an instance of a microservice configured to execute the instance request for the indicated function, and wherein the worker instance includes a service instance block manager configured to manage the first instance request in conjunction with subsequent service instance requests including associated instance identifiers that fall within the first discrete range of instance identifiers from the record of logical blocks.

20. The non-transitory computer-readable medium of claim 17, wherein the discrete ranges of instance identifiers associated with blocks of domain objects include one or more of:
   a range of associated user identifiers;
   a range of associated session identifiers;
   a range of associated internet protocol (IP) interfaces; or
   a range of timestamps associated with a plurality of instance requests.

* * * * *